United States Patent

Patel et al.

[11] Patent Number: 5,986,040
[45] Date of Patent: Nov. 16, 1999

[54] CRYSTALLINE POLYESTER RESINS AND PROCESS FOR THEIR PREPARATION

[75] Inventors: Bimal R. Patel; Gary F. Smith, both of Evansville, Ind.; Timothy E. Banach, Scotia, N.Y.

[73] Assignee: General Electric Company, Pittsfield, Mass.

[21] Appl. No.: 09/146,583

[22] Filed: Sep. 3, 1998

[51] Int. Cl.$^6$ .................................................. C08G 63/00
[52] U.S. Cl. ..................... 528/307; 528/272; 528/274; 528/279; 528/287; 528/481; 528/491
[58] Field of Search .................................. 528/272, 287, 528/307, 274, 279, 481, 491

[56] References Cited

U.S. PATENT DOCUMENTS

| | | | |
|---|---|---|---|
| 2,891,930 | 6/1959 | Caldwell et al. | 528/307 |
| 2,901,466 | 8/1959 | Kibler et al. | 528/288 |
| 4,349,469 | 9/1982 | Davis et al. | 524/765 |
| 4,897,453 | 1/1990 | Flora et al. | 525/439 |
| 5,399,661 | 3/1995 | Borman | 528/307 |
| 5,486,562 | 1/1996 | Borman et al. | 524/451 |

FOREIGN PATENT DOCUMENTS 0 353 990  2/1990  European Pat. Off. .

*Primary Examiner*—Samuel A. Acquah

[57] ABSTRACT

A moldable linear polyester resin consisting essentially of a polyester having the formula:

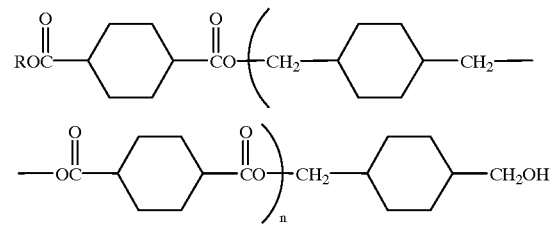

where R is an alkyl from 1 to 6 carbon atoms and n is greater than about 70, said polyester resin being derived from the transesterification reaction of a starting DMCD and a starting CHDM wherein the trans-cis ratio of repeating units derived from DMCD is preferably greater than about 8 to 1, and the trans-cis ratio of repeating units derived from DMCD is preferable greater than about 1 to 1, said polyester resin having crystalline properties with a preferable viscosity greater than 4500 poise and a melting temperature greater than 216 degrees Centigrade.

37 Claims, No Drawings

CRYSTALLINE POLYESTER RESINS AND PROCESS FOR THEIR PREPARATION

FIELD OF THE INVENTION

The invention relates to a polyesters, and more particularly of polyesters derived from cycloaliphatic diols and cycloaliphatic esters and a process for their formation.

BACKGROUND OF THE INVENTION

Poly(1,4-cyclohexylenedimethylene 1,4-cyclohexanedicarboxylate), PCCD, is a known polyester referred to in U.S. Pat. No. 2,891,930 to Caldwell et al and U.S. Pat. No. 2,901,466 to Kibler et al. Kibler et al discusses poly(1,4-cyclohexylenedimethylene 1,4-cyclohexanedicarboxylate) as one of the sixty-eight examples of linear polyesters and polyesteramides. According to Example 42, an excess amount of the glycol or 1,4-cyclohexanedimethanol component is utilized for making poly(1,4-cyclohexylenedimethylene 1,4-cyclohexanedicarboxylate).

U.S. Pat. No. 4,897,453 to Flora et al and U.S. Pat. No. 4,349,469 to Davis et al describe copolyesterethers derived from 1,4-cyclohexanedicarboxylic acid and a polytetramethyleneether glycol. Both patents describe the inclusion of a branching agent having at least three carboxyl or hydroxyl groups and a poly(oxytetramethylene) glycol component. The polyester-ethers are described as suitable for film and packaging where good optical clarity is essential.

U.S. Pat. No. 5,486,562 describes UV-stable weatherable molding compositions based upon cycloaliphatic diacid derived polyester materials containing impact-modifying elastomeric polymers and filler such as glass fibers, which compositions have enhanced melt flow properties while retaining good impact strength properties. The modulus of these compositions is low and while stiffness can be improved with added filler, like fiberglass, impact strength is reduced.

U.S. Pat. No. 5,399,661 to Borman et al relates to copolyester compositions which comprise the reaction product of at least one straight chain, branched, or cycloaliphatic C2–C10 alkane diol or a chemical equivalent and a mixture of at least two cycloaliphatic diacids. The diacid mixture comprises predominantly a trans isomer and at least one aromatic diacid. As set forth in column 5, lines 41 to 45, "The reaction is generally run with an excess of the diol component and in the presence of a suitable catalyst ***". U.S. Pat. No. 5,486,562 to Borman et al additionally describes an impact strength modifier for compositions of the type set forth in the '661 patent.

Typically, molding compositions based upon blends of thermoplastic resin incorporating 1,4-cyclohexanedicarboxylic acid residues in the polymer chain may have good impact resistance, good processability, and transparency. It is desirable to retain these properties while enhancing properties of solvent resistance and UV stability.

SUMMARY OF THE INVENTION

The present invention is directed to a moldable linear poly(1,4-cyclohexylenedimethylene 1,4-cyclohexanedicarboxylate), PCCD, resin having crystalline properties with a melting temperature and viscosity that make it suitable for polymer blends and an improved process for obtaining the PCCD with enhanced properties. According to such a process, the stoichiometry of the reactants is at predetermined amount.

Typically, the crystallinity of PCCD, is not as high as that of such commercially available polyesters as poly(1,4-butylene terephthalate), or "PBT" which is an ingredient of many resin blends, such as blends with polycarbonate and other thermoplastic polymers. In addition to imparting desirable molding characteristics, enhanced crystallinity imparts such advantageous properties as its resistance to solvents. Thus, it is desirable to enhance the crystallinity of poly(1,4-cyclohexylenedimethylene 1,4-cyclohexanedicarboxylate) and produce a poly(1,4-cyclohexylenedimethylene 1,4-cyclohexanedicarboxylate) with uniform melting properties which permit its incorporation into thermoplastic blends useful for weatherable molding type applications. Enhanced crystallinity results in a desirable higher melting temperature for a given degree of polymer polymerization.

For sake of clarity, the following Table 1 sets forth the meaning of the abbreviations used throughout the specification.

TABLE 1

Abbreviations

| Abbreviation | Name |
|---|---|
| PCCD | 1,4-cyclohexanedicarboxylic acid, polymer with 1,4-cyclohexanedimethanol (9CI Chemical Abstracts Index name); also poly(1,4-cyclohexylenedimethylene 1,4-cyclohexanedicarboxylate) |
| CHDM | 1,4-cyclohexanedimethanol (trans/cis mixture) |
| t-DMCD | dimethyl trans-1,4-cyclohexanedicarboxylate |
| TPT | tetrakis(2-isopropyl)orthotitanate; also titanium(IV) isopropoxide |
| MV | Melt Viscosity |
| $T_m$ | Melting Point |

In accordance with the present invention, a linear cycloaliphatic polyester resin consists essentially of a polyester having the formula:

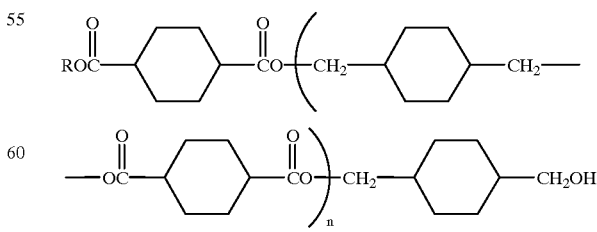

where R is an alkyl from 1 to 6 carbon atoms or residual endgroups derived from either monomer, and n is greater than about 70. The polyester is derived from the transesterification reaction of a starting DMCD and a starting CHDM. The trans-cis ratio of repeating units derived from DMCD is preferably greater than about 8 to 1, and the trans-cis ratio of repeating units derived from CHDM is preferable greater than about 1 to 1. The polyester resin has a viscosity greater than 4500 poise and a melting temperature greater than 216 degrees Centigrade, and an acid number less than about 10, preferably less than about 6 meq/kg.

The linear PCCD polyester is prepared by the condensation reaction of CHDM and DMCD in the presence of a catalyst wherein the starting DMCD has a trans-cis ratio greater than the equilibrium trans-cis ratio. The resulting prepared PCCD polyester has a trans-cis ratio of repeating polymer units derived from the respective starting DMCD which has a trans-cis ratio substantially equal to the respective starting trans-cis ratio for enhancing the crystallinity of the resulting PCCD.

The starting DMCD typically has a trans-cis ratio greater than about 6 to 1, preferably greater than 9 to 1, and even more preferably greater than 19 to 1. In the resulting PCCD, it is preferable that less than about 10 percent the starting trans DMCD, and more preferable that less than about 5 percent of the starting trans DMCD be converted to the cis isomer during the reaction of CHDM and DMCD to produce PCCD. The trans:cis ratio of the CHDM is preferable greater than 1 to 1, and more preferably greater than about 2 to 1.

The resulting linear PCCD polymer is characterized by the absence of branching. During the reaction process, branching may be induced by the addition of polyglycol and such branching agents as trimellitic acid or anhydride, trimesic acid, trimethylolethane, trimethylolpropane, or a trimer acid. The use of such branching agents is not desirable according to the present invention.

The preferred enhanced melt viscosity of the final prepared PCCD is greater than 4500 poise with temperatures of melting, $T_m$, being greater than about 220 degrees Centigrade. The acid number which is determined by the number of acid end groups on the polymer chain is preferably less than about 10, preferable less 6 meq/kg as determined from the titration method. Preferred melting temperature is preferably greater than about 216 degrees Centigrade and more preferably from about 216 to about 230 degrees Centigrade. Preferably the amount of catalyst present is less than about 200 ppm. Typically, catalyst may be present in a range from about 20 to about 300 ppm. Also, it is contemplated that certain stabilizers may be added during the process so that the final PCCD resin may include such stabilizers, preferable in an amount less than about one per cent by weight.

Also, according to present invention, the above described PCCD polyester is prepared according to process wherein starting CHDM and DMCD are reacted in the presence of a catalyst in an inert atmosphere to form an intermediate PCCD oligomer having ester end groups such as a carboxycyclohexanecarboxylate end group (or ester thereof) and acid or hydroxy end groups such as alkyoxycyclohexanealkyanol end groups. The PCCD oligomer preferably has hydroxy end group to ester end group present in about a 1 to 1 ratio so that molecular weight may be increased by further polymerization of the oligomer. The PCCD oligomer is next further reacted for increasing the molecular weight of the PCCD.

The starting CHDM has a trans-CHDM greater than the equilibrium amount and the reaction is carried out in an inert atmosphere under conditions to minimize trans to cis isomerization of said starting DMCD. These conditions require the starting PCCD and the starting CHDM to be present in a molar stoichiometric amount to a slight molar excess of DMCD so that the number of ester end groups such as acid or methyl carboxycyclohexanecarboxylate end groups and the number hydroxy end groups such as alkyoxycyclohexanealkyanol end groups are in substantially equal proportions for the PCCD oligomer. The resulting PCCD oligomer is then reacted to build molecular weight.

Also, in accordance with preferred conditions for preparing the PCCD oligomer, it is desirable to minimize the time period for forming the PCCD oligomer to prevent trans-to-cis isomerization. The utilization of a stoichiometric excess of diol or CHDM as a starting reactant slows the reaction rate and results in undesirable isomerization of DMCD. A slight stoichiometric excess of ester or DMCD is preferred to compensate for material imbalance created during the process, thereby enhancing the polymerization rate. Preferred starting temperatures of the reaction are from about 120 to about 140 degrees Centigrade. The preferred reaction temperature for forming the oligomer is from about 200 to about 250, preferably from 220 to 230 degrees Centigrade. The preferred order for adding reactants comprises charging the CHDM to the reaction vessel or container, adding the DMCD in slight stoichiometric excess, and, next, adding the catalyst to the reaction vessel containing the starting reactants at the initial reaction temperature. This step is preferably conducted under an inert atmosphere, such as nitrogen, to form a distillate which is typically collected by condensation. The distillate by-product is, based on the starting material, typically an aliphatic alcohol, such as an alkyl alcohol of 1 to 12 carbon atoms.

The step of further reacting the PCCD oligomer for increasing the molecular weight of the PCCD is carried to obtain a PCCD product that is suitable for use in polymer blends. The molecular weight is preferably increased under conditions of less than atmospheric pressure for removing distillate by-product. In the melt polycondensation stage, the temperature of the reaction mixture containing oligomers is increased to about 230 to 270 Centigrade. For solid state polymerization, the polycondensation reaction is carried between the Tg and Tm polymer under suitable conditions.

DETAILED DESCRIPTION

PCCD is an aliphatic polyester resin which has desirable properties for weatherable applications. The polyester is made by reacting dimethyl 1,4-cyclohexanedicarboxylate (DMCD) with 1,4-cyclohexanedimethanol (CHDM) in the presence of a catalyst (e.g. TPT). According to the present invention, control of stoichiometry during the process is critical for building molecular weight while minimizing isomerization of DMCD from trans to cis isomer. It is preferred that the molecular weight be maximized while preventing a decrease in the melting point of PCCD by the DMCD portion of the polymer isomerizing from trans to cis isomer. Preferably, the process produces PCCD resin having a viscosity of greater than 4500 poise (at 250° C.) resin with about $T_m$>216° C.

Melt polymerization of 1,4-cyclohexanedimethanol (CHDM) and dimethyl trans-1,4-cyclohexanedicarboxylate (t-DMCD) in the presence of a catalyst such as titanium (IV) isopropoxide (TPT) results in the polyester resin PCCD:

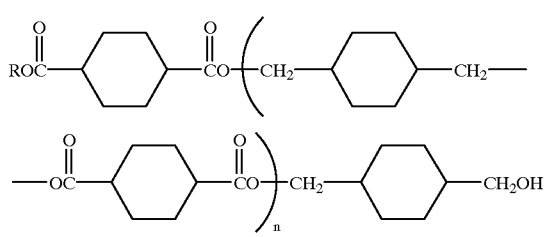

PCCD is an aliphatic polyester resin made from CHDM (diol), and t-DMCD (diester). In the present invention, n is preferably greater than about 70 and preferably from about 70 to about 100. R is an alkyl group of 1 to 6 carbon atoms. Preferably R is methyl or ethyl and most preferably methyl. The end groups consist essentially of 4-carboxycyclohexanecarboxylate group having the formula

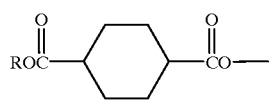

and 4-methanolcyclohexanemethylene group having the formula

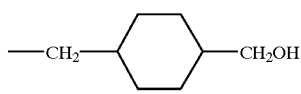

Preferably the end groups are present in substantially equal proportions. The PCCD of the present invention is characterized by a relatively low acid content.

Both monomers are hydrogenation products of DMT as set forth in the example below wherein hydrogenation of the aromatic ring leads to two geometric isomers, the trans and cis isomers for each monomer.

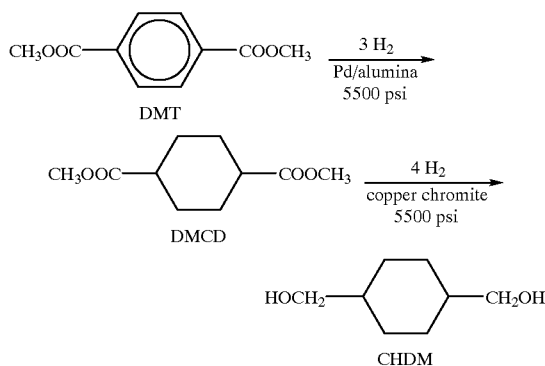

The monomers have the following formulation.

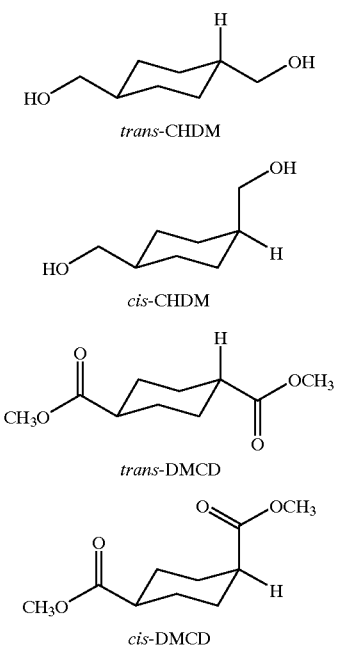

European 0 353 990 B1 (1994) to Y. Tateno describes a process to produce trans-enriched CHDM by selective distillation of trans-CHDM from cis/trans CHDM mixtures heated in the presence of base. CHDM is supplied with ~70–72% trans content, slightly below the thermodynamic equilibrium trans:cis ratio (~76% trans isomer). DMCD is available with >95% trans content. The thermodynamic equilibrium for DMCD is at ~66% trans content. It is preferable to have trans-enriched CHDM and DMCD as starting components above the thermodynamic equilibrium.

Upon hydrogenation of DMT, the two geometric isomers of CHDM and DMCD are obtained. When the starting DMCD comprises greater than about 90 percent trans content, the final PCCD comprises repeating units derived from DMCD having greater than about 85 percent trans content and preferably greater than about 90 percent trans content. Preferably, less than about 10 percent, more preferably less than about 5 percent of the DMCD undergoes isomerization.

The isomerization of DMCD is Lewis-acid (e.g. TPT) catalyzed and can occur during polymerization:

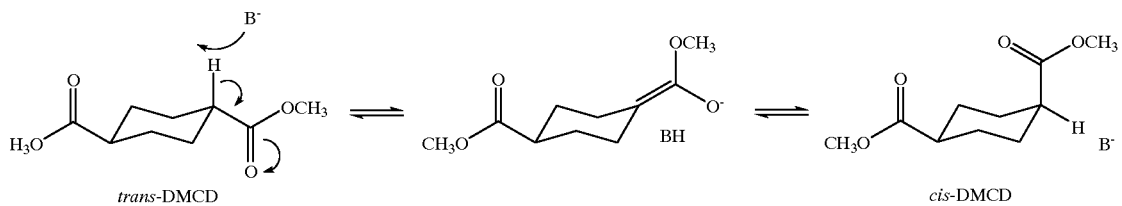

trans-DMCD                                                        cis-DMCD

The trans:cis ratios are important since the $T_m$ of the polymer is related to the trans:cis ratio. According to the present invention, the rate of isomerization vs. polymerization is an important parameter that is desirably controlled during the process for the formation of PCCD.

According to the present invention, when making PCCD polyester by a melt polymerization process, it is desirable to adjust the process parameters to obtain a predetermined and optimized melt viscosity and melting point $T_m$. The reaction rate and the mass balance of the PCCD polymerization reaction are desirably controlled so as to reduce variability of the maximum melt viscosity and reduce polymer $T_m$ variability.

PCCD may be produced with a melt viscosity of 5000 poise and a $T_m$=>220° C. at a Ti catalyst concentration of 200 ppm in a batch reactor. The variability in reaction rates and final melt viscosities is due to skewing of stoichiometry during the polymerization process. TGA results show that DMCD begins to vaporize at around 125° C., whereas CHDM begins to vaporize at 180° C. The variability in $T_m$ is due to trans to cis isomerization of the DMCD portions of the polymer backbone, which can be affected by longer reaction times. Higher trans content results in a higher $T_m$, higher degree of crystallinity, and faster crystallization rates.

Preferred reactor starting temperature was lowered to 130° C. CHDM was charged before t-DMCD. The vacuum rates for the polycondensation stage was ramped from an initial state to a higher vacuum. The stoichiometry was set at 1.005:1 diester:diol.

Table 2 below shows some properties of the PCCD polymer as a function of different melt viscosities and $T_m$'s.

TABLE 2

Some PCCD Properties

| Batch | A | B | C |
|---|---|---|---|
| MV (poise) | 4325 | 1735 | 6049 |
| $T_m$ (° C.) | 220 | 207 | 211 |
| Diester trans % | 90% | 82% | 85% |
| Diol trans % | 71% | 72% | 72% |
| Absolute $M_w$ (daltons) | 40,000 | 36,000 | 45,000 |
| Absolute $M_n$ (daltons) | 23,000 | 18,000 | 26,000 |
| Polydispersity | 1.75 | 1.94 | 1.74 |
| Degree of Polymerization | 74 | 58 | 83 |

The two most critical factors governing PCCD polymerization and the resulting polymer properties (e.g. $T_m$) were found to be: 1) control of stoichiometry prior to charging the reactor and in the reactor during the polymerization, and 2) control of trans to cis isomerization of DMCD during the polymerization.

The rates of transesterification reactions will depend on the sterics and electronics of the endgroups. Cyclohexyl endgroups are very bulky, especially compared to the hydroxybutyl endgroups found in PBT. For commercially produced polyesters such as poly(ethylene terephthalate), PET, and poly(butylene terephthalate), PBT, high diol:diester ratios are preferred because they enhance oligomer formation rates without inhibiting polycondensation rates. For PCCD, however, high glycol to diester monomer ratios lead to very slow polycondensation rates and an undesirable decrease in trans-DMCD content.

Therefore, proper measurement and addition of monomers when charging a reactor is critically important. In addition, side reactions, physical properties, and chemical properties of the monomers can significantly influence the degree to which the polymer builds molecular weight. For PCCD, side reactions do not appear to influence the degree of polymerization. The stoichiometry and the physical properties of the monomers, on the other hand, have turned out to be critically important.

The variability in melting point is attributed to the trans isomer content of the CHDM and DMCD moieties in the polymer. Although CHDM does not isomerize during the polymerization, its initial trans content still effects the final melting temperature of the polymer. In contrast, DMCD does show trans to cis isomerization during the polymerization process, in spite of its high initial trans content. The trans:cis ratios may be determined by C-13 NMR, and can be determined using a 300 MHz FT-NMR spectrometer.

Although the PCCD process is nominally run in an EI stage followed by a polycondensation stage, the polycondensation transesterification rates for PCCD appear to be extremely slow. The glycol component in PCCD is CHDM, which has two characteristics that make the polycondensation reaction difficult. First, CHDM has low volatility, making it difficult to remove from the system. Second, CHDM is very bulky and creates a large amount of steric hindrance that inhibits transesterification once the CHDM is attached to a t-DMCD carboxyl group. In other words, CHDM endgroups act like chain-stoppers due to slow transesterification kinetics. Therefore, in order to obtain high molecular weight PCCD, the ester interchange reactions are critical to building molecular weight. The result is that a stoichiometrically controlled ratio of diester to diol is required in order to obtain equal numbers of hydroxyl and ester endgroups and maximize build through ester interchange.

The preferred ratio of diester:diol (DMCD:CHDM) is 0.98 to 1.02; more preferred is 0.995 to 1.005. It is contemplated that a slight excess of diester DMCD may be added to compensate for volatility of DMCD during the reaction. Typically, such excess of DMCD utilized is less than one percent but the excess may vary from reactor to reactor.

LAB REACTION EXAMPLE

A typical laboratory scale procedure follows. A 500 ml 3-neck flask was charged with t-DMCD (100.00 g) and CHDM (71.66 g), a 1.005:1 diester:diol mole ratio. The flask was fitted with a mechanical stirrer, thermometer, and Dean-Stark trap with condenser, and then placed in an oil bath heated to 170° C. When the reaction temperature reached 155° C., tetraisopropyltitanate (TPT, 0.17 ml, 200 ppm based on theoretical polymer yield) was added to the flask and the timer was started. Methanol began to distill after about 2 minutes. The oil temperature was gradually heated to 230° C. over a 1 hr period, and then the Dean-Stark trap was replaced with a vacuum distillation head. At the end of the EI stage, a total of ~34 ml of distillate was collected (theoretical MeOH yield is 40.25 ml), and the reaction temperature was 212° C. After attaching the vacuum apparatus to the reaction flask, vacuum was slowly and carefully applied to avoid foaming and entrainment of oligomers in the distillation head. A melt viscosity of >4500 poise was achieved in 2–3 hrs time under vacuum.

In order to make PCCD Polyester Resin in a pilot batch reactor with MV>4200 poise (typically 5000–6000 poise) and $T_m$>216° C. (typically ~220° C.), the following procedure was followed.

The batch reactor was heated to 130° C. was charged with CHDM (71.8 lbs) followed by t-DMCD (100.0 lbs) and TPT catalyst (69 ml) under nitrogen. The reaction temperature was ramped to 230° C. at 2° C./min during the ester interchange (EI) stage. Upon completion of the EI stage, the polycondensation stage was initiated by increasing temperature further and decreasing the reactor pressure. The reactor pressure was decreased at a rate of 10–25 Torr/min. until less than 1 Torr was achieved; the temperature was increased to between 250–270° C. at a rate of 2° C./min. Examples are shown in the Table 3 below.

solved at reflux in a solution of ortho-cresol and methylene chloride. After cooling to room temperature, the carboxyl end groups are titrated with 0.01 N-tetrabutylammonium hydroxide/2,2,2-trifluoroethanol. Carboxyl endgroups are reported as millimole equivalents per kilogram.

The effect of different catalyst levels is shown in Table 4 below.

TABLE 4

Effect of Varying Catalyst Levels

| Example | Ti (ppm) | MV | $T_m$ | Rxn Time | DMCD:CHDM |
|---------|----------|------|-----|----------|-----------|
| D | 125 | 3848 | 217 | 5:44 | 1.005:1 |
| E | 150 | 4416 | 219 | 4:08 | 1.005:1 |
| F | 175 | 4965 | 222 | 2:41 | 1.005:1 |
| G | 200 | 3834 | 221 | 3:00 | 1.005:1 |

When the mixture of isomers or more than one diacid is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most preferred chemical equivalent comprises the dimethyl ester of the acid, particularly dimethyl trans-1,4-cyclohexanedicarboxylate.

TABLE 3

Pilot Plant Examples

| Example | DMCD:CHDM | [Ti] (ppm) | Final Temp. (° C.) | Total Time (hrs) | MV (poise) | $T_m$ |
|---------|-----------|------------|--------------------|------------------|------------|------|
| 1 | 0.962 | 100 | 265 | 5:30 | 1621 | 223 |
| 2 | 0.962 | 200 | 265 | 9:15 | 6049 | 211 |
| 3 | 0.977 | 200 | 266 | 4:59 | 1208 | 223 |
| 4 | 0.990 | 200 | 268 | 6:25 | 4329 | 208 |
| 5 | 0.991 | 200 | 266 | 6:39 | 5487 | 207 |
| 6 | 0.995 | 200 | 265 | 5:30 | 950 | 222 |
| 7 | 0.995 | 200 | 270 | 5:42 | 1518 | 208 |
| 8 | 0.995 | 100 | 268 | 6:42 | 1735 | 207 |
| 9 | 0.995 | 100 | 260 | 6:32 | 1909 | 208 |
| 10 | 1.003 | 200 | 265 | 3:30 | 7763 | 220 |
| 11 | 1.004 | 200 | 266 | 3:13 | 4605 | 226 |
| 12 | 1.004 | 200 | 265 | 3:45 | 4636 | 227 |
| 13 | 1.004 | 200 | 261 | 3:40 | 5648 | 224 |
| 14 | 1.004 | 175 | 265 | 3:50 | 5769 | 223 |
| 15 | 1.004 | 175 | 264 | 3:50 | 5769 | 223 |
| 16 | 1.004 | 175 | 265 | 3:50 | 6035 | 223 |
| 17 | 1.005 | 200 | 265 | 2:15 | 5359 | 219 |
| 18 | 1.005 | 200 | 265 | 3:45 | 5430 | 221 |
| 19 | 1.005 | 200 | 265 | 3:45 | 6133 | 220 |
| 20 | 1.005 | 200 | 265 | 4:30 | 6148 | 216 |

The procedures used for measuring melt viscosity (MV) and polymer melting point ($T_m$) follow. A Perkin-Elmer DSC-7 with Pyris software was used to measure melt temperatures. The typical DSC sample size was 4–6 mg. The DSC heating and cooling rates are 20° C./min, and the melting temperatures are taken from the endotherm peak maximum of the second heating cycle. In cases where double melting peaks are seen, the peak maximum of the highest temperature peak is reported as the $T_m$.

The MV measurements were run on a Göttfert instrument at 250° C. with a 21.6 Kg weight. The orifice used had dimensions of 0.615" length×0.042" diameter. The sample size was 5 grams, and the sample was dried at 150° C. for 1 hr.

Carboxyl end groups (COOH) were determined by a general equivalence-point titration. A solid sample is dis- The reaction is generally run in the presence of a suitable catalyst such as a tetrakis (2-ethyl hexyl) titanate, in a suitable amount, typically about 50 to 500 ppm of titanium based upon the final product. Preferably less than 200 ppm. Typical catalysts including transitions metals, other alternative catalysts and co-catalysts as known in the art may be utilized. Metals such as Zr, Sn, Ge, Sb, Al are typical catalysts. The catalyst level as referred to herein is based on the ppm of catalyst per theoretical polymer weight, such as 200 ppm titanium per weight polymer. Typically, the amount of catalyst present is less than 500 ppm.

The color of the PCCD is typically a natural color and may have a slight pale yellow coloration. Optical clarity is preferred. Preferably the preferred color as measured by a color clarity index b* is less than about 8. Additionally, additives such as stabilizers may be added to the reaction mixture to stabilize the mixture. Preferably such additives do not contribute to a yellowing of the resulting PCCD. Preferred additives are phosphite stabilizers such as disteryl pentaerythritol diphosphite, diisooctyl phosphite, distearyl phosphite, triphenyl phosphite, diphenyl isodecyl phosphite, and distearyl pentaerythritol diphosphite. The phosphites may be of the formula:

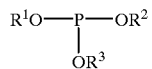

where $R^1$, $R^2$ and $R^3$ are independently selected from the group consisting of hydrogen, alkyl and aryl with the proviso that at least one of $R^1$, $R^2$ and $R^3$ is hydrogen or alkyl. Phosphites are typically utilized in an amount equal to about 0.01 to about 2 parts by weight per 100 parts by weight resin (phr). Amounts of about 0.01 to about 1 phr are more preferred, although most compositions will contain about 0.025 phr or more.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

What is claimed is:

1. A moldable linear polyester resin consisting essentially of a polyester having the formula:

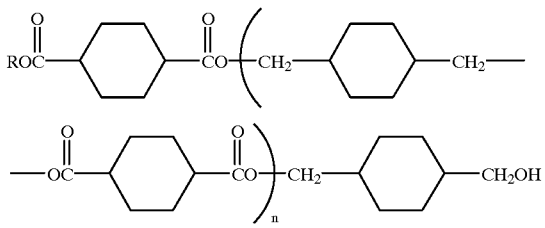

where R is an alkyl from 1 to 6 carbon atoms and n is greater than about 70, said polyester resin being derived from the transesterification reaction of a starting DMCD and a starting CHDM wherein the trans-cis ratio of repeating units derived from DMCD in the polymer is greater than about 6 to 1, and the trans-cis ratio of repeating units derived from CHDM is greater than about 1 to 1 the polymer, said polyester resin having crystalline properties with a viscosity greater than 4200 poise and a melting temperature in the range of about 216 to about 230 degrees Centigrade.

2. A linear PCCD polyester according to claim 1 wherein the ratio of repeating units derived from DMCD to units derived from CHDM in the polymer is based on the starting ratio of DMCD to CHDM of 0.98 to 1.02.

3. A linear PCCD polyester resin according to claim 2 wherein trans to cis ratio of the DMCD isomer is greater than about 9 to 1.

4. A linear PCCD polyester resin according to claim 3 wherein trans to cis ratio of the CHDM isomer is greater than about greater than about 2 to 1.

5. A linear PCCD polyester according to claim 3 having a melt viscosity of greater than 4500 poise at 250 degrees Centigrade with temperatures of melting, $T_m$, being greater than about 216 degrees Centigrade.

6. A linear PCCD polyester having a melt viscosity dependent on the degree of polymerization produced by the condensation reaction of CHDM and DMCD in the presence of a catalyst wherein said starting DMCD has a predetermined trans-cis ratio greater than the equilibrium trans-cis ratio and the resulting prepared PCCD polyester has a trans-cis ratio of repeating polymer units derived from the respective starting DMCD which has respective trans-cis ratios substantially equal to the trans-cis ratio of said starting DMCD, said PCCD having a trans-cis ratio of repeating units derived from CHDM greater than about 1 to 1, said polyester resin having a viscosity greater than 4200 poise at 250 degrees Centigrade and a melting temperature in the range of about 216 to about 230 degrees Centigrade.

7. A linear PCCD polyester according to claim 6 wherein the ratio of repeating units derived from DMCD to units derived from CHDM in the polymer is based on the starting ratio of DMCD to CHDM of 0.98 to 1.02.

8. A linear PCCD polyester resin according to claim 7 wherein trans to cis ratio of the DMCD isomer in the polymer is greater than about 6 to 1.

9. A linear PCCD polyester resin according to claim 7 wherein less than about 10 percent the starting trans DMCD isomer is converted to cis during the reaction of CHDM and DMCD to produce PCCD.

10. A linear PCCD polyester according to claim 8 wherein the trans-cis ratio in the polymer of the CHDM isomer is about 2 to 1.

11. A linear PCCD polyester according to claim 10 wherein the trans-cis ratio of the DMCD isomer is greater than about 9 to 1 and the melting point is from about 218 to about 230 degrees Centigrade.

12. A linear PCCD polyester according to claim 6 wherein the ratio of repeating units derived from DMCD to units derived from CHDM in the polymer is based on the starting ratio of DMCD to CHDM of 0.995 to 1.005.

13. A linear PCCD polyester according to claim 12 wherein the said PCCD polymer is characterized by the absence of branching agents.

14. A linear PCCD polyester according to claim 13 having a melt viscosity of greater than 5000 poise with temperatures of melting, $T_m$, being greater than about 220 degrees Centigrade.

15. A linear PCCD polyester according to claim 13 having an acid number which is determined by the number of acid end groups on the polymer chain is less than about 6 meq/kg as determined from the titration method.

16. A linear PCCD polyester according to claim 13 having a color index b* less than about 8.

17. A linear PCCD polyester according to claim 13 including a catalyst.

18. A linear PCCD polyester according to claim 17 having wherein said catalyst is titanium and is present in an amount less than about 500 ppm.

19. A linear PCCD polyester according to claim 18 including stabilizers.

20. A process for producing PCCD polyester comprising reacting a starting CHDM and a starting DMCD in the presence of a catalyst and in an inert atmosphere to form an intermediate PCCD oligomer having ester and hydroxy end groups, and further reacting said PCCD oligomer for increasing the molecular weight of said PCCD, said starting DMCD having a trans-cis isomer ratio greater than a equilibrium amount of a trans-cis isomer ratio, said reaction in said inert atmosphere being carried out under conditions to minimize trans to cis isomerization of said starting DMCD, said conditions comprising a) said starting DMCD and said starting CHDM being present in a molar stoichiometric amount to a slight molar excess of DMCD, and b) increasing the temperature of said reactants from an initial reaction temperature to a final temperature wherein said PCCD polymer is formed within a time period of about 1 to about 6 hours.

21. A process for producing PCCD polyester according to claim 20 wherein said molar stoichiometric amount comprises a small excess of diester DMCD to compensate for volatility of DMCD during said reaction.

22. A process for producing PCCD polyester according to claim 21 wherein said molar stoichiometric amount is in a ratio of DMCD to CHDM from about 0.98 to about 1.02.

23. A process for producing PCCD according to claim 22 polyester comprising minimizing the time period to prevent trans to cis isomerization of said DMCD.

24. A process for producing PCCD polyester according to claim 22 comprising carrying out the reaction from a starting temperature from about 120 to about 140 degrees Centigrade.

25. A process for producing PCCD polyester according to claim 21 wherein said molar stoichiometric amount is in a ratio of DMCD to CHDM from about 0.995 to about 1.005.

26. A process for producing PCCD polyester according to claim 25 comprising carrying out the reaction at a final reaction temperature for forming the oligomer of from about 200 to about 250 degrees Centigrade.

27. A process for producing PCCD polyester according to claim 26 comprising adding reactants and catalyst according to the order of charging the CHDM to the reaction vessel or container, adding the DMCD in slight stoichiometric excess, and, next, adding the catalyst to the reaction vessel containing the starting reactants at the initial reaction temperature.

28. A process for producing PCCD polyester according to claim 27 comprising the step of further reacting the PCCD oligomer for increasing the molecular weight of the PCCD, is carried out under reaction conditions to build the molecular weight of PCCD and obtain a PCCD product that is used in polymer blends.

29. A process for producing PCCD polyester according to claim 27 comprising increasing the molecular weight of said oligomer PCCD by reacting said oligomer PCCD under conditions of less than atmospheric pressure for removing distillate by-product.

30. A process for producing PCCD polyester according to claim 29 comprising wherein the temperature of the reaction mixture containing oligomer is gradually increased to a temperature of about 245–270 degrees Centigrade to produce said PCCD polymer.

31. A process for producing PCCD polyester according to claim 20 comprising increasing the molecular weight of said PCCD by solid state polymerization of said PCCD oligomer.

32. A process for producing PCCD polyester according to claim 20 wherein the repeat unit derived from DMCD has a trans-cis ratio is greater than about 6 to 1 in the polymer.

33. A process for producing PCCD polyester according to claim 20 the wherein the repeat unit derived from DMCD has a trans-cis ratio is greater than about 8 to 1.

34. A process for producing PCCD polyester according to claim 20 wherein less than about 10 percent of the repeat unit derived from DMCD is converted from trans to cis isomer during said reaction.

35. A process for producing PCCD polyester according to claim 20 wherein less than about 5 percent the repeat unit derived from DMCD is converted to trans to cis during said reaction.

36. A process for producing PCCD polyester according to claim 20 wherein a stabilizer is present in said reaction mixture.

37. A process for producing PCCD polyester according to claim 36 wherein said stabilizer comprises a phosphite stabilizer.

* * * * *